US011783611B2

(12) United States Patent
Ramsl

(10) Patent No.: US 11,783,611 B2
(45) Date of Patent: Oct. 10, 2023

(54) MACHINE LEARNING FOR DOCUMENT COMPRESSION

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 326 days.

(21) Appl. No.: 17/009,526

(22) Filed: Sep. 1, 2020

(65) Prior Publication Data

US 2022/0067364 A1 Mar. 3, 2022

(51) Int. Cl.
*G06K 9/00* (2022.01)
*G06N 20/00* (2019.01)
(Continued)

(52) U.S. Cl.
CPC ............ *G06V 30/414* (2022.01); *G06N 3/04* (2013.01); *G06N 20/00* (2019.01); *G06V 30/153* (2022.01); *G06V 30/10* (2022.01)

(58) Field of Classification Search
CPC ...... G06V 30/41; G06V 30/40; G06V 30/414; G06V 30/148; G06V 10/10; G06V 10/26; G06V 30/10; G06V 30/153; G06V 30/12; G06V 30/127; G06V 30/133; G06V 30/14; G06V 30/141; G06V 30/142; G06V 30/1423; G06V 30/1426; G06V 30/1429; G06V 30/1431; G06V 30/1434; G06V 30/1437; G06V 30/144; G06V 30/1444;
(Continued)

(56) References Cited

U.S. PATENT DOCUMENTS 6,718,333 B1 * 4/2004 Matsuda ............... G06F 16/313
707/706
2002/0135790 A1 * 9/2002 Ishiguro ............... H04N 1/4092
358/1.9
(Continued)

OTHER PUBLICATIONS

Bakkali, Souhail, et al. "Visual and textual deep feature fusion for document image classification." Proceedings of the IEEE/CVF Conference on Computer Vision and Pattern Recognition Workshops. Jun. 1, 2020. (Year: 2020).*
(Continued)

*Primary Examiner* — Edward F Urban
*Assistant Examiner* — Duy Tran
(74) *Attorney, Agent, or Firm* — SCHWEGMAN LUNDBERG & WOESSNER, P.A.

(57) ABSTRACT

In an example embodiment, machine learning is used to intelligently compress documents to reduce the overall footprint of storing large amounts of files for an organization. Specifically, a document is split into parts, with each part representing a grouping of text or an image. Optical character recognition is performed to identify the text in images. Machine learning techniques are then applied to a part of a document in order to determine how relevant the document is for the organization. The parts that are deemed to be not relevant may then be reduced in size, either by omitting them completely or by summarizing them. This allows for the compression to be tailored specifically to the organization, resulting in the ability to compress or eliminate parts of documents that other organizations might have found relevant (and thus would not have been compressed or eliminated through traditional means).

21 Claims, 6 Drawing Sheets

(51) Int. Cl.
*G06K 9/34* (2006.01)
*G06N 3/04* (2023.01)
*G06V 30/414* (2022.01)
*G06V 30/148* (2022.01)
*G06V 30/10* (2022.01)

(58) Field of Classification Search
CPC .......... G06V 30/1448; G06V 30/1452; G06V 30/1456; G06V 30/146; G06V 30/1463; G06V 30/1465; G06V 30/1468; G06V 30/147; G06V 30/1473; G06V 30/1475; G06V 30/1478; G06V 30/15; G06V 30/155; G06V 30/158; G06V 30/1607; G06V 30/1613; G06V 30/162; G06V 30/164; G06V 30/166; G06V 30/18; G06V 30/1801; G06V 30/18029; G06V 30/18038; G06V 30/18048; G06V 30/18067; G06V 30/18076; G06V 30/18086; G06V 30/18105; G06V 30/18133; G06V 30/18143; G06V 30/18152; G06V 30/18171; G06V 30/18181; G06V 30/1819; G06V 30/182; G06V 30/1823; G06V 30/1826; G06V 30/1829; G06V 30/1831; G06V 30/1834; G06V 30/1837; G06V 30/184; G06V 30/186; G06V 30/187; G06V 30/188; G06V 30/19; G06V 30/19007; G06V 30/19013; G06V 30/19027; G06V 30/19033; G06V 30/1904; G06V 30/19047; G06V 30/19053; G06V 30/1906; G06V 30/19073; G06V 30/1908; G06V 30/19087; G06V 30/19093; G06V 30/191; G06V 30/19107; G06V 30/19113; G06V 30/19127; G06V 30/19133; G06V 30/1914; G06V 30/19147; G06V 30/19153; G06V 30/1916; G06V 30/19167; G06V 30/19173; G06V 30/1918; G06V 30/19187; G06V 30/19193; G06V 30/192; G06V 30/194; G06V 30/195; G06V 30/196; G06V 30/198; G06V 30/1983; G06V 30/1985; G06V 30/1988; G06V 30/199; G06V 30/20; G06V 30/22; G06V 30/222; G06V 30/224; G06V 30/2247; G06V 30/2253; G06V 30/226; G06V 30/2264; G06V 30/2268; G06V 30/2272; G06V 30/2276; G06V 30/228; G06V 30/24; G06V 30/242; G06V 30/244; G06V 30/2445; G06V 30/245; G06V 30/2455; G06V 30/246; G06V 30/248; G06V 30/2504; G06V 30/2528; G06V 30/2552; G06V 30/26; G06V 30/262; G06V 30/268; G06V 30/274; G06V 30/28; G06V 30/287; G06V 30/293; G06V 30/30; G06V 30/302; G06V 30/304; G06V 30/32; G06V 30/333; G06V 30/347; G06V 30/36; G06V 30/373; G06V 30/387; G06N 20/00; G06N 20/10; G06N 20/20; G06N 3/04; G06N 3/02; G06N 5/02; G06N 5/025
See application file for complete search history.

(56) References Cited

U.S. PATENT DOCUMENTS

| | | | | |
|---|---|---|---|---|
| 2005/0289182 | A1* | 12/2005 | Pandian | G06Q 10/10 |
| 2006/0171587 | A1* | 8/2006 | Kanatsu | G06V 30/413 |
| | | | | 382/199 |
| 2015/0254555 | A1* | 9/2015 | Williams, Jr. | G06N 3/045 |
| | | | | 706/14 |
| 2017/0255840 | A1* | 9/2017 | Jean | G06V 10/817 |
| 2018/0316571 | A1* | 11/2018 | Andrade | G06Q 10/101 |

OTHER PUBLICATIONS

"Lanzaer Ultra-Light-Fast-Generic-Face-Detector-1MB", GitHub, Inc., [Online]. Retrieved from the Internet: URL: https: github.com Linzaer Ultra-Light-Fast-Generic-Face-Detector-1MB, (Apr. 26, 2021), 10 pgs.

"Chartjs Chart.js: Simple HTML5 Charts using the canvas tag", GitHub, [Online]. Retrieved from the Internet: URL: https: github. com chartjs Chart.js, (Accessed Jun. 4, 2021), 3 pgs.

"Category: Logos of companies by company", Wikimedia Commons, [Online]. Retrieved from the Internet: URL: https: commons. wikimedia.org wiki Category:Logos_of_companies_by_company, (Apr. 19, 2021), 6 pgs.

"Hub retrain.py at master-tensorflow hub", GitHub, [Online]. Retrieved from the Internet: <URL: https://github.com/tensorflow/hub/blob/master/examples/image_retraining/retrain.py, (Accessed Jun. 4, 2021), 27 pgs.

"ImageMagick—Command-line Options", ImageMagick Studio LLC, [Online]. Retrieved from the Internet: URL: https: www.imagemagick. org script command-line-options.php#brightness-contrast, (Access Jun. 4, 2021), 61 pgs.

"How to count the number of black and white pixels (linux, imagemagik, etc)—Stack Overflow", [Online]. Retrieved from the Internet: URL: https: stackoverflow.com questions 25174231 how-to-count-the-number-of-black-and-white-pixels-linux-imagemagik-etc, (Accessed Jun. 4, 2021), 4 pgs.

"Ageitgey face-recognition: The world's simplest facial recognition api for Python and the command line", GitHub, [Online]. Retrieved from the Internet: URL: https: github.com ageitgey face_recognition, (Sep. 26, 2020), 13 pgs.

Chinchor, Nancy, "Information Extraction Task Version 3.5—MUC-7 Named Entity Task Definition", [Online]. Retrieved from the Internet: URL: https: www-nlpir.nist.gov related_projects muc proceedings ne_task.html, (Sep. 17, 1997), 23 pgs.

Katti, Anoop, "Chargrid: Towards Understanding 2D Documents", Published as a conference paper at EMNLP. arXiv:1809.08799v1 [cs.CL] Sep. 24, 2018, (2018), 11 pgs.

Kurama, Vihar, "Table OCR for Detecting and Extracting Tabular Information", Nano Net Technologies Inc., [Online]. Retrieved from the Internet: URL: https: nanonets.com blog table-extraction-deep-learning , (Accessed Jun. 4, 2021), 53 pgs.

* cited by examiner

MACHINE LEARNING FOR DOCUMENT COMPRESSION

TECHNICAL FIELD

This document generally relates to machine learning. More specifically, this document relates to using machine learning for document compression.

BACKGROUND

As organizations move more and more documents to cloud storage, there has been an increasing concern in the amount of storage utilized by these organizations. While disk storage itself may be cheap, the sheer quantity of business documents that are stored by an organization can overwhelm even cloud-based storage. A single organization may need to store thousands or even millions of documents. While some of these documents are text-based and thus may be stored as relatively smaller sized text files, many of the documents contain at least some graphics. Often if a document contains any graphics at all the entire document is stored in a file format that supports graphic storage, such as portable document format (PDF) or Joint Photographic Experts Group (JPEG) formats. What is needed is a way to intelligently reduce the footprint of storing thousands or millions of documents in graphic-based filed formats.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, machine learning is used to intelligently compress documents to reduce the overall footprint of storing large amounts of files for an organization. Specifically, a document is split into parts, with each part representing a grouping of text or an image. Optical character recognition (OCR) is performed to identify the text in images. Machine learning techniques are then applied to a part of a document in order to determine how relevant the document is for the organization. The parts that are deemed to be not relevant may then be reduced in size, either by omitting them completely or by summarizing them. This allows for the compression to be tailored specifically to the organization, resulting in the ability to compress or eliminate parts of documents that other organizations might have found relevant (and thus would not have been compressed or eliminated through traditional means).

Figure 1:
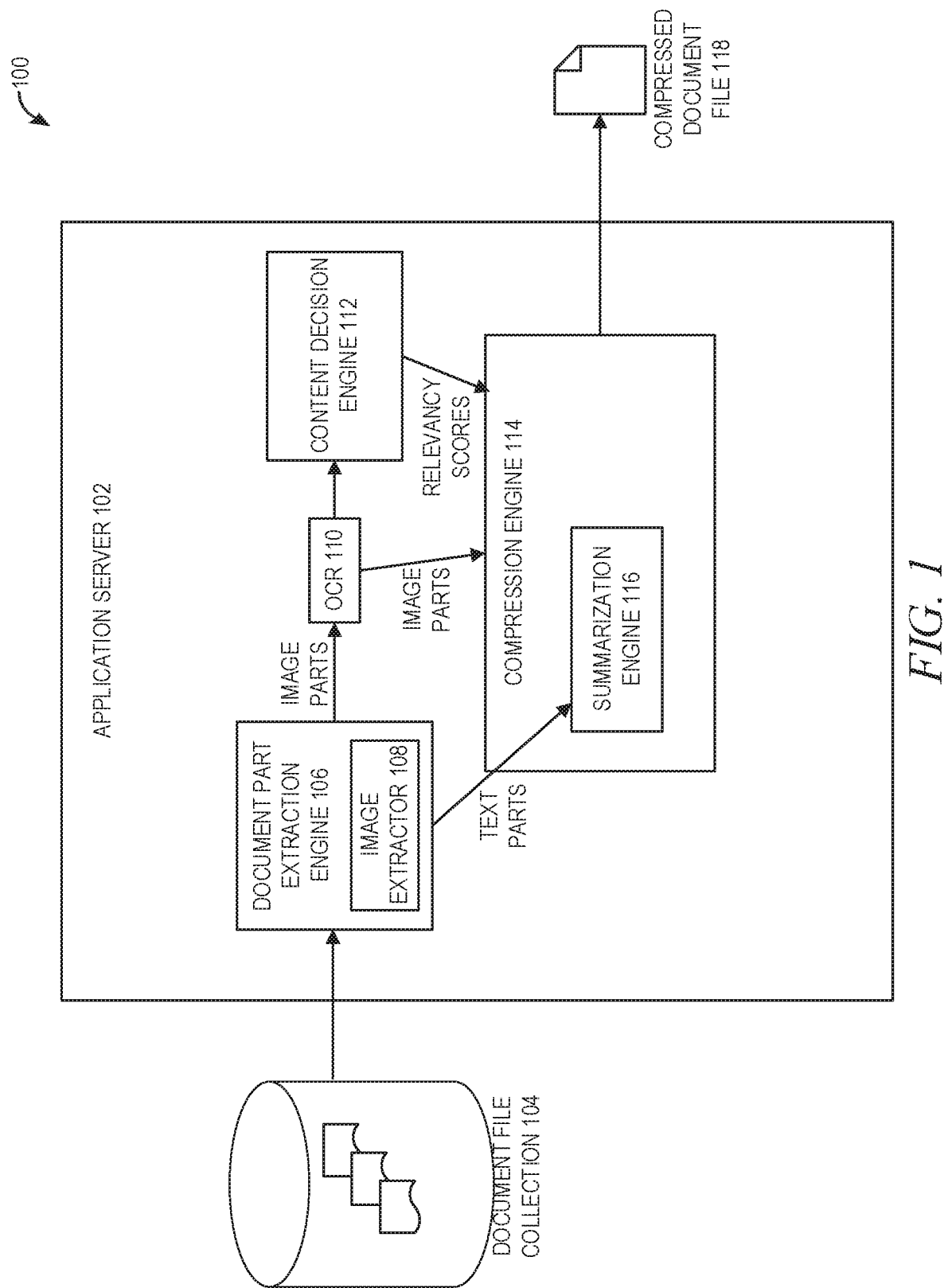
FIG. 1 is a block diagram illustrating a system for using machine learning to compress computer documents, in accordance with an example embodiment.

FIG. 1 is a block diagram illustrating a system 100 for using machine learning to compress computer documents in accordance with an example embodiment. Here, an application server 102 runs a series of components to perform the compression. In some example embodiments, the application server 102 may be cloud-based. A document file collection 104 of an organization may contain many different document files (potentially thousands or millions) for the organization. One or more of these document files may be passed to a document part extraction engine 106, which acts to extract parts of the document files. Each part may correspond to either a text portion of the document or an image in the document file. A document file may comprise one or more of these parts. In an example embodiment, image parts are extracted using an image extractor 108, while any parts not extracted using the image extractor 108 may be considered to be text.

Image parts may contain text even though they are not themselves text. As such, OCR 110 may be performed on the image parts to identify the text in the image. Depending on the file format of the document file, OCR 110 may also be performed on the text parts of the document (in some file formats, the text parts are already stored in text-readable form and thus do not require OCR).

At this point, a document file has been divided into one or more image parts and/or one or more text parts. Since the image parts are the parts that make up the most storage space in a file, in an example embodiment only the image parts are passed to a content decision engine 112 to determine whether the parts are relevant to the organization. Image parts that are determined to be non-relevant to the organization can be discarded or compressed. In some example embodiments, however, both image parts and text parts are passed to the content decision engine 112, although only some of the techniques that the content decision engine 112 uses to determine relevance will be useful in analyzing text parts.

The output of the content decision engine 112 may create a relevance score for each analyzed part of a document file. In an example embodiment, the relevance score is a number between 0 and 1, with 1 being the most relevant to the organization and 0 being the least relevant to the organization. These scores may then be passed to a compression engine 114, which may then compress the document file based on the scores. In an example embodiment, the compression engine 114 determines whether or not to eliminate, compress, or leave as-is each part of the document file based on the relevance scores. Compressing may include using a summarization engine 116, which will be described in more detail below. The result is a compressed document file 118 that was intelligently compressed based on the relevancy of its parts to the particular organization.

Turning now to the content decision engine 112, a number of different subcomponents of this engine analyze positive and negative characteristics of a document file part to determine its relevancy to the organization. A positive characteristic is a characteristic that, if present in the part, is indicative of relevancy of the part to the organization. A negative characteristic is a characteristic that, if present, is indicative of a lack of relevancy of the part to the organization. A subscore for each of these characteristics is generated and then these subscores are combined to generate the relevancy score for the part.

Figure 2:
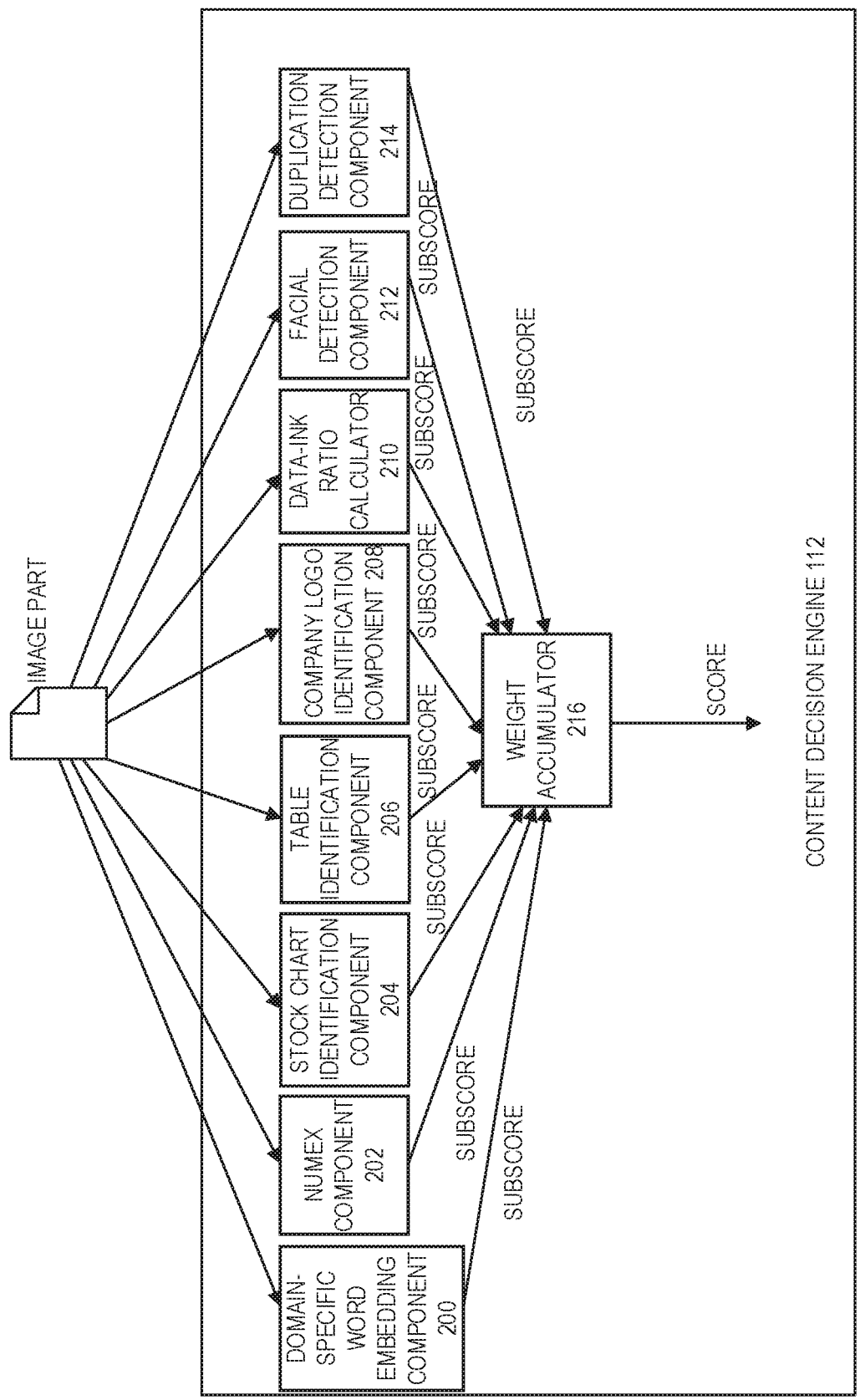
FIG. 2 is a block diagram illustrating a content decision engine, in accordance with an example embodiment.

FIG. 2 is a block diagram illustrating a content decision engine 112 in accordance with an example embodiment. A domain-specific word embedding component 200 uses a trained specific language model, with word embeddings trained on unstructured data to recognize words that pertain to the words contained in the training data. Thus, when the model is trained using training data that is specific to the organization, the resulting model will also be specific to the organization and is able to recognize words that are related to the organization. Examples of training data that can be used for an organization include contracts, agreements, invoices, and dunning letters. The domain-specific pretrained word embedding thus enables a fine-grained recognition of domain-typical entities such as financial reports. Specific words for the financial report domain, such as operating profit, liquidity, cash flow, and the like, receive higher attention.

In an example embodiment, the domain-specific word embedding component 200 uses a Word2Vec embedder. A Word2Vec embedder is a shallow, two-layer neural network trained to reconstruct linguistic contexts of words. Word2Vec takes as input a large corpus of text and produces a vector space, typically of several hundred dimensions, with each unique word in the corpus being assigned a corresponding vector in the space. Word vectors are positioned in the vector space such that words that share common contexts in the corpus are in close proximity to one another in the space.

During an inference phase, the word embeddings can be used to determine the percentage with which a part of a document file is using vocabulary of a given domain. For example, if 89% of part of a document file uses vocabulary from the domain "financial report," then the financial report domain may be assigned a subscore of 0.89.

A numex component 202 extracts certain types of numeric values from the text of the part of the document file and then determines the percentage of text that comprises those types of numeric values. Specifically, the numex component 202 looks for percentages and currency values. These are numbers that are preceded by or followed by currency symbols or percentage symbols. The percentage of text that comprises either currency or percentage numbers can then be multiplied by a fixed value to arrive at a subscore from the numex component 202. For example, the fixed value may be 20. Any subscore greater than 1 can be rounded down to 1.

A stock chart identification component 204 then performs its own machine learning process to determine whether an image part of the document file is a stock chart. In an example embodiment, a long-short term memory (LSTM)-based convolutional neural network (CNN) is trained to make this determination. An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which values to save in the cell. The third layer then updates the new cell state based on the decisions from the first and second layers. The fourth layer is another sigmoid layer that decides what will be output.

To this end, the CNN may be trained with a set of open, high, low, close (OHLC) tuples, which are bar charts that show open, high, low, and closing price for a stock or security for each period. The bar charts for the training data may be generated using past stock data. The output from the stock chart identification component 204 is a subscore indicative of the probability that the corresponding image part is a stock chart.

A table identification component 206 then performs its own machine learning process to determine whether an image part of the document file contains a table. Tables contain information in a 2-dimensional structure. A custom OCR tool may be used to identify such two-dimensional (2D) structure in an image part. Prior art techniques for making this determination have serialized a document into one dimensional text first. The custom OCR tool, however, preserves the spatial structure of the input part by representing it as a sparse 2D grid of characters. A document understanding task is then formulated as an instance-level semantic segmentation. More precisely, the model predicts a segmentation mask with pixel-level labels and object bounding boxes to group multiple instances of the same class.

Specifically, a special representation may be constructed from character boxes, which are bounding boxes that each surround a single character somewhere in a given document part. This positional information can come from an OCR engine or can be directly extracted from the layout information in the document (such as in PDF or Hypertext Markup Language (HTML) files). The coordinate space of a character box is defined by page height H and width W and is usually measured in units of pixels.

The complete text of a document page can then be represented as a set of tuples $D=\{(c_k, b_k)|k=0, \ldots, n\}$, where $c_k$ denotes the k-th character in the page and $b_k$ denotes the associated character box of the k-th character, which is formalized by the top-left pixel position, width, and height, or $b_k=(x_k, y_k, w_k, h_k)$.

The special representation $g \in \mathbb{N}^{H \times W}$ can then be constructed and its character pixel $g_{ij}$ from the set D with:

$$g_{ij} = \begin{cases} E(c_k) & \text{if } (i, j) < b_k \\ 0 \end{cases}$$

where $\prec$ means "overlaps with" and where each point (i, j) corresponds to some pixel in the original document page pixel coordinate space defined by (H, W). $E(c_k)$ is an encoding of the character in the k-th character box; i.e., the value of character $c_k$ may be mapped to a specific integer index. For instance, the alphabet or any character of interest may be mapped to non-zero indices $\{a, b, c, \ldots\} \rightarrow \{1, 2, 3, \ldots\}$. Note that it may be assumed that the character boxes do not overlap, but in cases where they do, the character-pixel may be assigned to the box that has the closest box center. In other words, the special representation is constructed as follows: for each character $c_k$ at location $b_k$, the area covered by that character is filled with some constant index value $E(c_k)$. All remaining character-pixels corresponding to empty regions on the original document page are initialized with 0.

Before the special representation is used as input to a neural network, 1-hot encoding may be applied to it. Thus, the original representation $g \in \mathbb{N}^{H \times W}$ becomes a vector representation $\tilde{g} \in \mathbb{R}^{H \times W \times N_C}$ where $N_c$ denotes the number of characters in the vocabulary including a padding/background character mapped to 0 and an unknown character.

The encoded special representation then may be used as input to a CNN to perform semantic segmentation on the special representation and predict a class label for each character-pixel in the document. As there can be multiple and an unknown number of instances of the same class, instance segmentation may be performed. Thus, in addition to predicting a segmentation mask, bounding boxes may also be predicted using techniques from object detection. This allows the model to assign characters from the same segmentation class to distinct instances.

The neural network may comprise two main parts: the encoder network and the decoder network. The decoder network is further made up of a segmentation branch and a bounding box regression mask. In an example embodiment, the encoder may be a Visual Geometry Group (VGG)-type network with dilated convolutions, batch normalization, and spatial dropout. The encoder comprises five blocks, where each block has three 3×3 convolutions (which themselves are made of convolution, batch normalization, Rectifier Linear Unit (ReLu) activation) followed by spatial dropout at the end of a block. The first convolution in a block is a stride-2 convolution to downsample the input to that block. Whenever downsampling occurs, the number of output channels C of each convolution may be increased by a factor of two. In blocks four and five of the encoder, no downsampling needs to be applied. Dilated convolutions may be used in block three, four, five with rates $d=2, 4, 8$, respectively. The decoder for semantic segmentation and for bounding box regression are both made of convolutional blocks which essentially reverse the downsampling of the encoder via stride-2 transposed convolutions.

Each block first concatenates features from the encoder via lateral connections followed by 1×1 convolutions. Subsequently, upsampling happens via a 3×3 stride-2 transposed convolution. This is followed by two 3×3 convolutions. The decoder for semantic segmentation has an additional convolutional layer without batch normalization, but with bias and with softmax activation. The number of output channels of the last convolution corresponds to the number of classes. Together with the encoder, the decoder for the bounding box regression task forms a one-stage detector, which makes use of focal loss. Output from the table identification component 206 is a probability that the image part of the document file contains a table.

A company logo identification component 208 then performs its own machine learning process to determine whether an image part of the document file includes a company logo. Specifically, a neural network can be trained on company logos obtained from public information sources. Output from the company logo identification component 208 is a probability that the image part of the document file contains a company logo.

The aforementioned components are all measuring positive characteristics. Some components then measure negative characteristics. Specifically, a data-ink ratio calculator 210 calculates a ratio of data-ink to non-data-ink. Data-ink is the pixel color used to convey the data, while non-data ink are the pixel colors used as backgrounds. In a black and white drawing, black ink is traditionally the data-ink and white is the non-data-ink, but in grayscale and color drawings, any color could be used as the data-ink and any color(s) as the non-data-ink. The data-ink ratio calculator 210 converts any color images to grayscale and increases the contrast, so that actual data is more easily detectable visually. A histogram function is then used to compute the percentage of black pixels in the image. If the ratio is less than 20 percent, then the image may be considered not relevant, while a ratio of more than 20 percent is indicative of that the image may be considered relevant.

A facial detection component 212 then uses facial recognition techniques to determine whether the image part of the document file contains a face. If so, this is a negative indicator of it being relevant.

Finally, a duplication detection component 214 determines whether the image part of the document file has a duplicate in the corpus. This may be accomplished by maintaining a hash table and hashing each image into the hash table. If the hashing finds an existing image that has already been hashed, then it is a duplicate and can be removed in order to reduce memory.

The output from each of the components 200-214 may be fed to a weight accumulator 216. The weight accumulator combines all the scores from the various components 200-214 and produces a single output score reflecting the probability that the part of the document file being examined is relevant to the organization. This may be accomplished by, for example, performing a weighted average on the subscores output by each of the components 200-214. The weighted average involves multiplying a weight for each of the components 200-214 to the corresponding subscores from the components 200-214 and then averaging the products. In some example embodiments, a more complicated function may be used. For example, if the duplicate detection component 214 finds that there is a high likelihood that the image part of the document file is a duplicate, then the other subscores may be irrelevant because the image part could still be removed from the document file even if all the other factors indicated a high degree of relevancy.

In another example embodiment, the weight accumulator 216 is a machine learned model that is trained to learn the weights assigned to each of the subscores. In this way, the weights may be personalized specifically for the organization, the type of organization, the context of the documents, and/or other factors. For example, organization A may care more about whether an image is a stock chart than organization B does, and thus the subscore related to the probability that the image part is a stock chart is given a higher weight for organization A than organization B.

In such a machine learned model embodiment, in some examples, user behavior may be tracked, and the machine learned model can learn certain user patterns. These patterns may then be used to weight the subscores differently to arrive at different decisions on whether a part of a document file is relevant to the organization depending on the user. For example, users in the marketing domain may have more use for certain types of images than users in the engineering domain at an organization. Thus, the decision may not be merely organization-specific but may additionally be domain-specific.

Referring back to FIG. 1, the output from the content decision engine 112 may then be passed to the compression engine 114 to decide whether to compress (or in the extreme, discard) the corresponding part of the document file. To the extent that text within the part is to be compressed, the summarization engine 116 may perform this task. In an example embodiment, the summarization engine 116 utilizes a sequence-to-sequence machine learned model. The sequence-to-sequence machine learned model is a recurrent neural network (RNN) trained on a collection of documents. In an example embodiment, summarization is performed only for text parts with greater than five sentences. For image parts, the compression engine 114 may select from multiple different compression or other types of actions to perform on each image part. For example, the compression engine 114 may choose whether to leave the image part uncompressed, discard it completely, or perform one of one or more different possible types of image compression on the image part. One type of image compression could be to remove non-data-ink (e.g., whitespace) from the image part. In an example embodiment, the compression engine 114 makes the decision based on the output from the content decision engine 112. In a simple case, the content decision engine outputs a score between 0 and 1, with 1 indicative of highest relevance of the image part to the organization and 0 indicative of lowest relevance. The compression engine 114 may then compare this score to a single threshold (e.g., 0.5) and if the score is higher than the threshold, then the image part is deemed relevant and not compressed, while if the score is lower than the threshold, then the image part is discarded. In a slightly more complicated case, the compression engine uses multiple thresholds to obtain different "grades" of how relevant the image part is to the organization and performs different actions based on the grade. For example, if the score is higher than a first threshold (e.g., 0.7), the image part is deemed completely relevant and not compressed or discarded. If the score is between the first threshold and a second threshold (e.g., 0.3), then the image part is deemed partially relevant and compressed but not discarded. Finally, if the score is below the second threshold, the image part is deemed completely irrelevant and is discarded.

Other types of output from the content decision engine 112 are also foreseen, as it is not mandatory that only a single score is output. For example, the content decision engine 112 may indicate a relevancy score but then also indicate whether the image part is a duplicate as a separate indication, thereby allowing the image part to be deemed "relevant" but still be discarded by the compression engine due to it being a duplicate in the document corpus of the organization.

Figure 3:
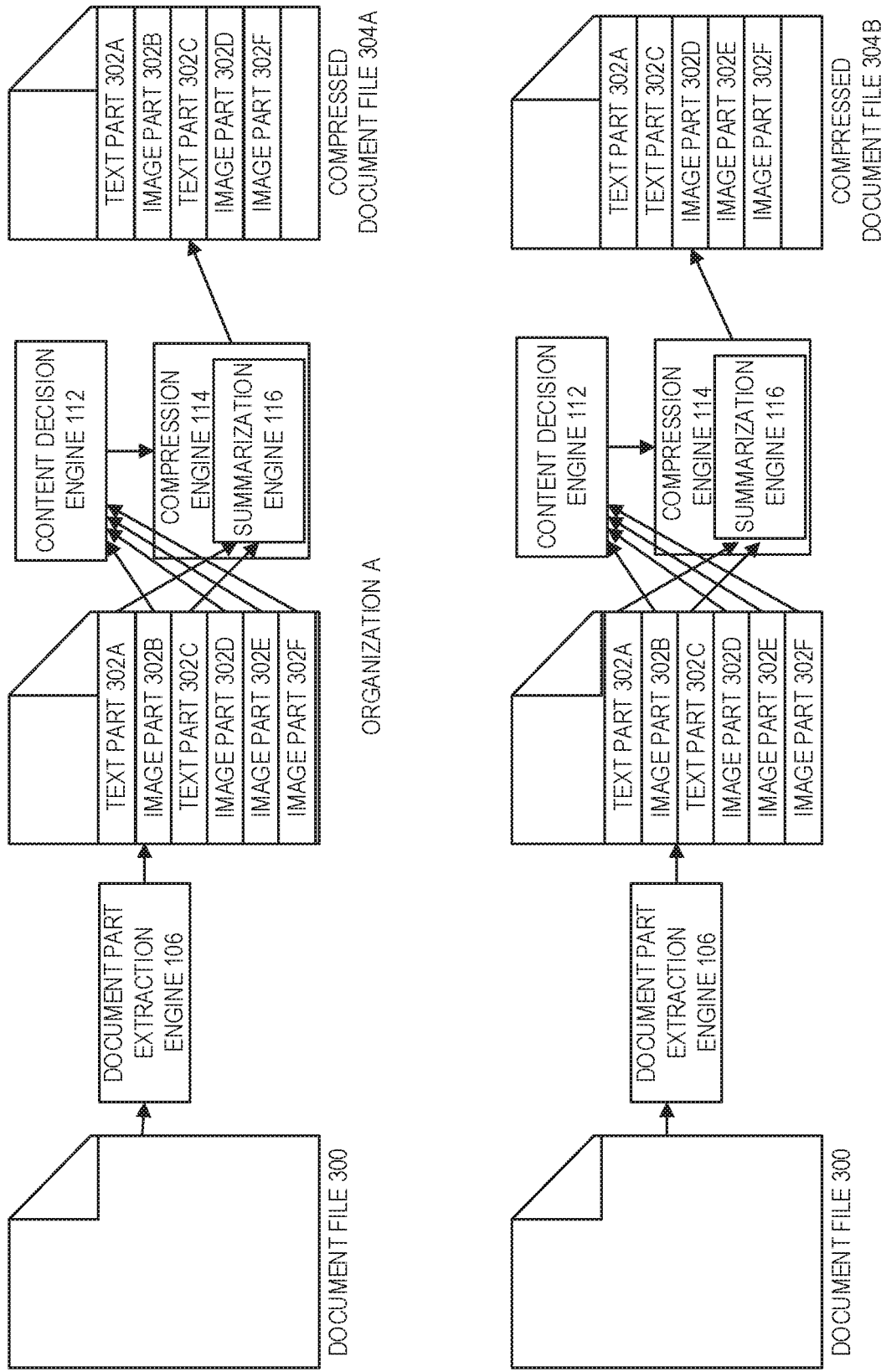
FIG. 3 is a diagram illustrating an example of compressing a document file, in accordance with an example embodiment.

FIG. 3 is a diagram illustrating an example of compressing a document file 300, in accordance with an example embodiment. Specifically, this diagram helps illustrate how the compression of the same document file 300 could potentially be performed differently depending on the organization that contains the document file 300 in its document collection. It should be noted that this diagram is presented merely for illustrative purposes and it is not necessary that the exact same document file be present in two different organizations' document collections.

For both organization A and organization B, the document file 300 is fed to a document part extraction engine 106, which acts to extract the different parts 302A-302F of the document file. The result is that document file 300 is split into the different parts 302A-302F. This may include text parts 302A, 302C, and image parts 302B, 302D, 302E, and 302F. As described above, the text parts 302A, 302C may be sent to a summarization engine 116 for summarization, while the image parts 302B, 302D, 302E, and 302F are sent to the content decision engine 112.

As described above, in an example, the content decision engine 112 produces output relevancy scores for each of the image parts 302B, 302D, 302E, and 302F based on the positive and negative characteristics of each image part, and these relevancy scores are organization specific. The result is that, as an example, image part 302B for organization A is assigned a score of 0.9 while the same image part 302B for organization B is assigned a score of 0.15. Since the scores of each image part 302B, 302D, 302E, and 302F are potentially different, when the scores are used by the compression engine 114 to determine how and whether to compress or discard, the results may be different depending on the organization. As such, for example, image part 302B is kept in a compressed document file 304A for organization A, but discarded in a compressed document file 304B for organization B.

Some of the image parts, of course, may be treated the same, as they may have been assigned the same score between organizations, such as image part 302D, or because their difference in scores was not enough to change the actions that the compression engine 114 performs for them. Additionally, in some cases, an image part, such as image part 302E, may be relevant for both organization A and organization B but may have a duplicate in organization A's document collection but not in organization B's document collection, and as such, this image part 302E may be discarded for organization A but not organization B.

Figure 4:
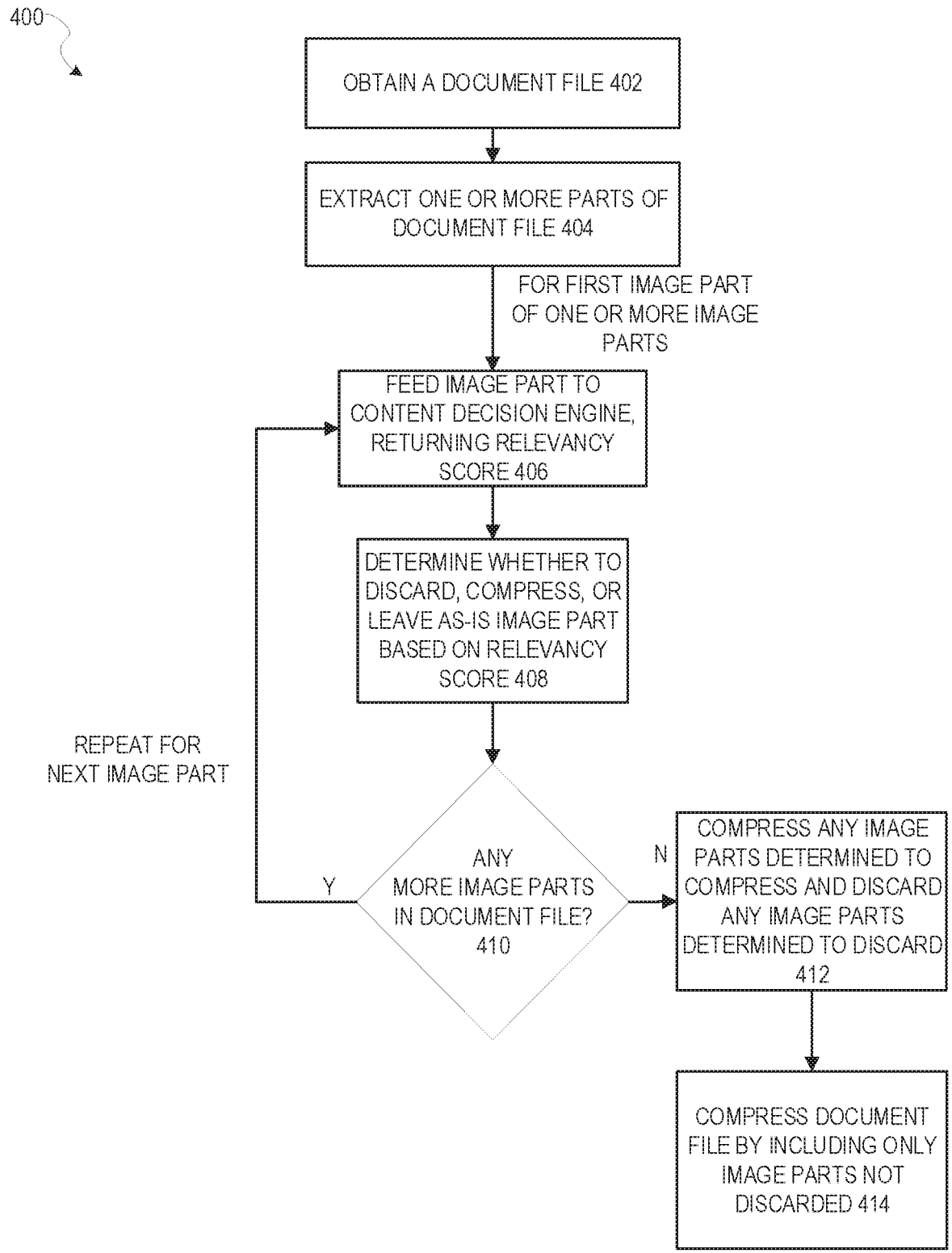
FIG. 4 is a flow diagram illustrating a method for compressing a document file, in accordance with an example embodiment.

FIG. 4 is a flow diagram illustrating a method 400 for compressing a document file, in accordance with an example embodiment. At operation 402, a document file is obtained from a document collection of an organization. At operation 404, one or more parts or the document file are extracted, with the one or more parts including one or more image parts. Then a loop is begun for each image part. At operation 406, the image part is fed to a content decision engine, and the content decision engine generates a relevancy score for the image part based on relevancy of the image part to the organization, utilizing a first machine learned model trained by a first machine learned algorithm using a set of training data unique to the organization. Then, at operation 408, it is determined whether to discard, compress, or leave as-is the image part based on the relevancy score. At operation 410, it is determined if there are any additional image parts extracted from the document file. If so, then the method 400 loops back to operation 406 for the next image part. If not, then at operation 412, any image parts determined to be compressed are compressed and any image parts determined to be discarded are discarded. Then at operation 414, the document file is compressed by including only image parts that have not been discarded in a compressed version of the document file.

EXAMPLES

Example 1. A system comprising:
    at least one hardware processor; and
    a non-transitory computer-readable medium storing instructions that, when executed by the at least one hardware processor, cause the at least one hardware processor to perform operations comprising:
    obtaining a document file from a document collection of an organization;
    extracting one or more parts of the document file, the one or more parts including one or more image parts;
    for each image part of the one or more image parts:
        feeding the image part to a content decision engine, the content decision engine generating a relevancy score for the image part based on relevancy of the image part to the organization, the content decision engine utilizing a first machine learned model trained by a first machine learned algorithm using a set of training data unique to the organization;

based on the relevancy score for at least one image part of the one or more image parts, discarding the at least one image part; and compressing the document file by including only image parts that have not been discarded in a compressed version of the document file.

Example 2. The system of Example 1, wherein the content decision engine performs optical character recognition (OCR) of text in each image part of the one or more image parts and feeds the optically recognized characters to a word embedding machine learned model trained using domain-specific text in the set of training data unique to the organization.

Example 3. The system of Examples 1 or 2, wherein the content decision engine further calculates a percentage of the text in each image part that comprises a currency or percentage value.

Example 4. The system of any of Examples 1-3, wherein the content decision engine further includes a long-short term memory (LSTM)-based convolutional neural network (CNN) trained to determine whether the image part constitutes a stock chart.

Example 5. The system of any of Examples 1-4, wherein the content decision engine further includes a table identification component including an OCR tool designed to identify two-dimensional structures in an image part.

Example 6. The system of Example 5, wherein the OCR tool includes a neural network that identifies bounding boxes of characters in an image part and constructs a sparse two-dimensional grid of some of the characters.

Example 7. The system of any of Examples 1-6, wherein the one or more image parts are a plurality of image parts and the operations further comprise:

compressing an image part based on the relevancy score for the image part; and wherein the compressing the document file further comprises including the compressed image part in the compressed document file.

Example 8. A method comprising:

obtaining a document file from a document collection of an organization;

extracting one or more parts or the document file, the one or more parts including one or more image parts;

for each image part of the one or more image parts:

feeding the image part to a content decision engine, the content decision engine generating a relevancy score for the image part based on relevancy of the image part to the organization, the content decision engine utilizing a first machine learned model trained by a first machine learned algorithm using a set of training data unique to the organization;

based on the relevancy score for at least one image part of the one or more image parts, discarding the at least one image part; and compressing the document file by including in a compressed version of the document file only image parts that have not been discarded.

Example 9. The method of Example 8, wherein the content decision engine performs optical character recognition (OCR) of text in each image part of the one or more image parts and feeds the optically recognized characters to a word embedding machine learned model trained using domain-specific text in the set of training data unique to the organization.

Example 10. The method of Examples 8 or 9, wherein the content decision engine further calculates a percentage of the text in each image part that comprises a currency or percentage value.

Example 11. The method of any of Examples 8-10, wherein the content decision engine further includes a long-short term memory (LSTM)-based convolutional neural network (CNN) trained to determine whether the image part constitutes a stock chart.

Example 12. The method of any of Examples 8-11, wherein the content decision engine further includes table identification component including an OCR tool designed to identify two-dimensional structures in an image part.

Example 13. The method of Example 12, wherein the OCR tool includes a neural network that identifies bounding boxes of characters in an image part and constructs a sparse two-dimensional grid of some of the characters.

Example 14. The method of any of Examples 8-13, wherein the one or more image parts are a plurality of image parts and the method further comprises:

compressing an image part based on the relevancy score for the image part; and wherein the compressing the document file further comprises including the compressed image part in the compressed document file.

Example 15. A non-transitory machine-readable medium storing instructions which, when executed by one or more processors, cause the one or more processors to perform operations comprising:

obtaining a document file from a document collection of an organization;

extracting one or more parts or the document file, the one or more parts including one or more image parts;

for each image part of the one or more image parts:

feeding the image part to a content decision engine, the content decision engine generating a relevancy score for the image part based on relevancy of the image part to the organization, the content decision engine utilizing a first machine learned model trained by a first machine learned model using a set of training data unique to the organization;

based on the relevancy score for at least one image part of the one or more image parts, discarding the at least one image part; and compressing the document file by including only image parts that have not been discarded in a compressed version of the document file.

Example 16. The non-transitory machine-readable medium of Example 15, wherein the content decision engine performs optical character recognition (OCR) of text in each image part of the one or more image parts and feeds the optically recognized characters to a word embedding machine learned model trained using domain-specific text in the set of training data unique to the organization.

Example 17. The non-transitory machine-readable medium of Examples 15 or 16, wherein the content decision engine further calculates a percentage of the text in each image part that comprises a currency or percentage value.

Example 18. The non-transitory machine-readable medium of any of Examples 15-17, wherein the content decision engine further includes a long-short term memory (LSTM)-based convolutional neural network (CNN) trained to determine whether the image part constitutes a stock chart.

Example 19. The non-transitory machine-readable medium of any of Examples 15-18, wherein the content decision engine further includes table identification component including an OCR tool designed to identify two-dimensional structures in an image part.

Example 20. The non-transitory machine-readable medium of Example 19, wherein the OCR tool includes a neural network that identifies bounding boxes of characters in an image part and constructs a sparse two-dimensional grid of some of the characters.

Figure 5:
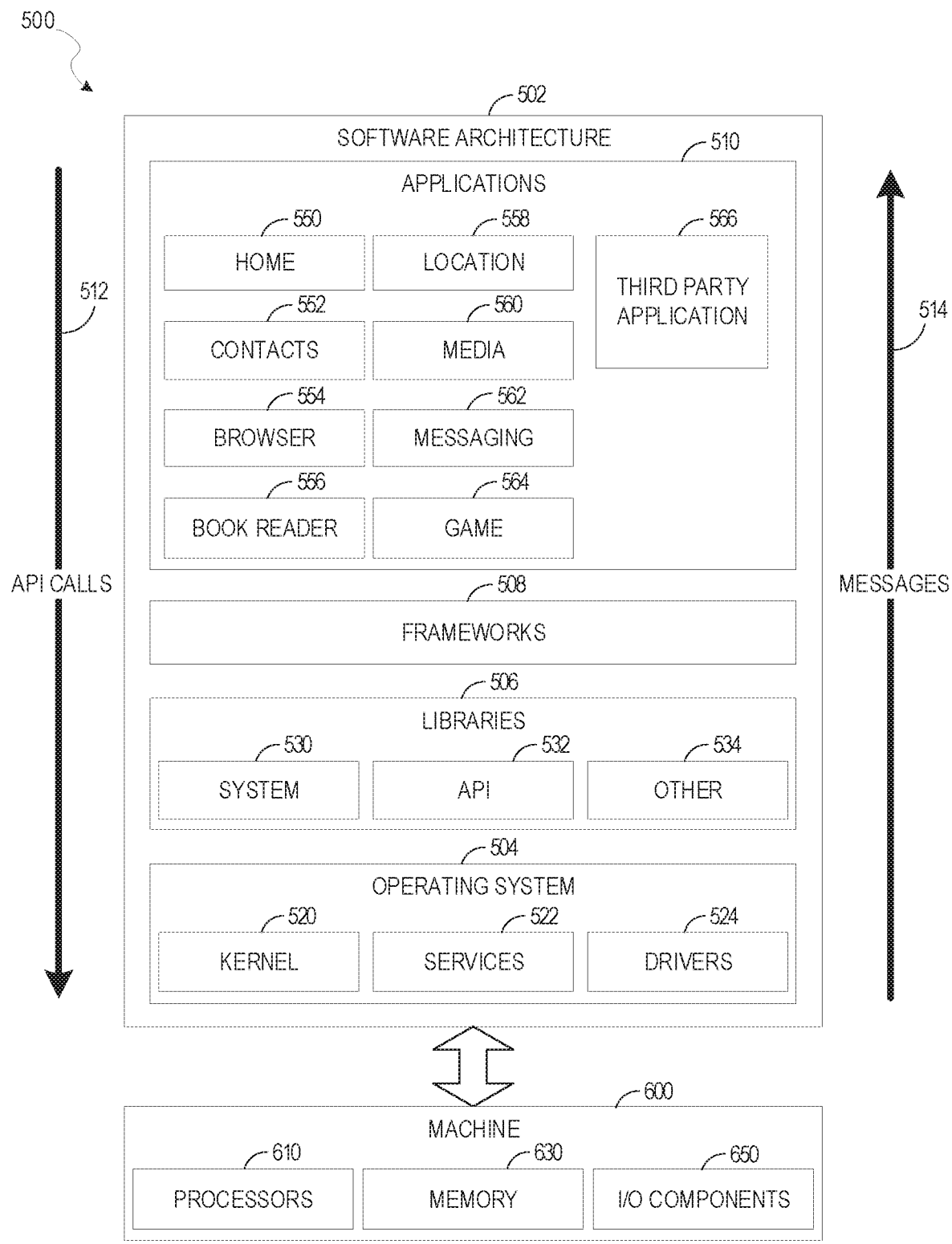
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
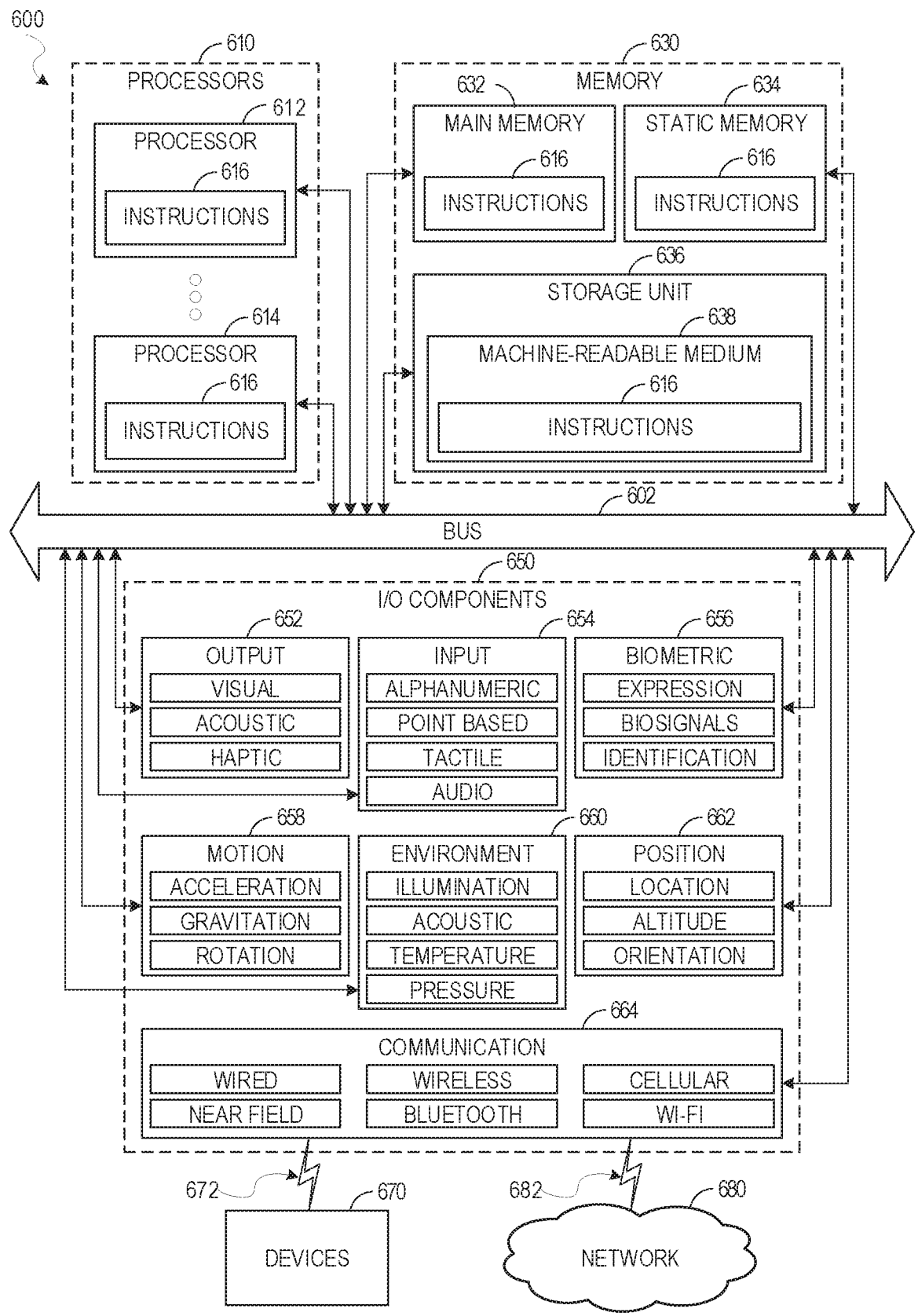
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   obtaining a document file from a document collection of a particular organization, the particular organization being a company or other grouping of people;
   extracting one or more parts of the document file, the one or more parts including one or more image parts;
   for each image part of the one or more image parts:
   feeding the image part to a content decision engine, the content decision engine generating an organization-specific score for the image part based on relevancy of the image part to the particular organization, the content decision engine utilizing a first machine learned model trained by a first machine learned algorithm using a set of training data unique to the particular organization, wherein the first machine learned model assigns a different weight to a probability that the image part corresponds to a first image type because the document file is of the particular organization than if the document file was of another organization;
   based on the organization-specific score for at least one image part of the one or more image parts, discarding the at least one image part; and
   compressing the document file by including only image parts that have not been discarded in a compressed version of the document file.

2. The system of claim 1, wherein the content decision engine performs optical character recognition (OCR) of text in each image part of the one or more image parts and feeds optically recognized characters to a word embedding machine learned model trained using domain-specific text in the set of training data unique to the particular organization.

3. The system of claim 1, wherein the content decision engine further calculates a percentage of text in each image part that comprises a currency or percentage value.

4. The system of claim 1, wherein the content decision engine further includes a long-short term memory (LSTM)- based convolutional neural network (CNN) trained to determine whether the image part constitutes a stock chart.

5. The system of claim 1, wherein the content decision engine further includes a table identification component including an optical character recognition (OCR) tool designed to identify two-dimensional structures in each image part of the one or more image parts.

6. The system of claim 5, wherein the OCR tool includes a neural network that identifies bounding boxes of characters in each image part of the one or more image parts and constructs a sparse two-dimensional grid of some of the characters.

7. The system of claim 1, wherein the one or more image parts are a plurality of image parts and the operations further comprise, for each image part of the plurality of image parts:
compressing a corresponding image part based on the organization-specific relevancy score for the corresponding image part; and
wherein the compressing the document file further comprises including the compressed corresponding image part in the compressed document file.

8. The system of claim 1, wherein the compressing includes:
summarizing text parts of the document using a sequence-to-sequence recurrent neural network trained on a collection of documents.

9. A method comprising:
obtaining a document file from a document collection of a particular organization, the particular organization being a company or other grouping of people;
extracting one or more parts of the document file, the one or more parts including one or more image parts;
for each image part of the one or more image parts:
feeding the image part to a content decision engine, the content decision engine generating an organization-specific score for the image part based on relevancy of the image part to the particular organization, the content decision engine utilizing a first machine learned model trained by a first machine learned algorithm using a set of training data unique to the particular organization, wherein the first machine learned model assigns a different weight to a probability that the image part corresponds to a first image type because the document file is of the particular organization than if the document file was of another organization;
based on the organization-specific score for at least one image part of the one or more image parts, discarding the at least one image part; and
compressing the document file by including only image parts that have not been discarded in a compressed version of the document file.

10. The method of claim 9, wherein the content decision engine performs optical character recognition (OCR) of text in each image part of the one or more image parts and feeds optically recognized characters to a word embedding machine learned model trained using domain-specific text in the set of training data unique to the particular organization.

11. The method of claim 9, wherein the content decision engine further calculates a percentage of text in each image part that comprises a currency or percentage value.

12. The method of claim 9, wherein the content decision engine further includes a long-short term memory (LSTM)-based convolutional neural network (CNN) trained to determine whether the image part constitutes a stock chart.

13. The method of claim 9, wherein the content decision engine further includes a table identification component including an optical character recognition (OCR) tool designed to identify two-dimensional structures in each image part of the one or more image parts.

14. The method of claim 13, wherein the OCR tool includes a neural network that identifies bounding boxes of characters in each image part of the one or more image parts and constructs a sparse two-dimensional grid of some of the characters.

15. The method of claim 9, wherein the one or more image parts are a plurality of image parts and the method further comprises, for each image part of the plurality of image parts:
compressing a corresponding image part based on the organization-specific relevancy score for the corresponding image part; and
wherein the compressing the document file further comprises including the compressed corresponding image part in the compressed document file.

16. A non-transitory machine-readable medium storing instructions which, when executed by one or more processors, cause the one or more processors to perform operations comprising:
obtaining a document file from a document collection of a particular organization, the particular organization being a company or other grouping of people;
extracting one or more parts of the document file, the one or more parts including one or more image parts;
for each image part of the one or more image parts:
feeding the image part to a content decision engine, the content decision engine generating an organization-specific score for the image part based on relevancy of the image part to the particular organization, the content decision engine utilizing a first machine learned model trained by a first machine learned algorithm using a set of training data unique to the particular organization, wherein the first machine learned model assigns a different weight to a probability that the image part corresponds to a first image type because the document file is of the particular organization than if the document file was of another organization;
based on the organization-specific score for at least one image part of the one or more image parts, discarding the at least one image part; and
compressing the document file by including only image parts that have not been discarded in a compressed version of the document file.

17. The non-transitory machine-readable medium of claim 16, wherein the content decision engine performs optical character recognition (OCR) of text in each image part of the one or more image parts and feeds optically recognized characters to a word embedding machine learned model trained using domain-specific text in the set of training data unique to the particular organization.

18. The non-transitory machine-readable medium of claim 16, wherein the content decision engine further calculates a percentage of text in each image part that comprises a currency or percentage value.

19. The non-transitory machine-readable medium of claim 16, wherein the content decision engine further includes a long-short term memory (LS™)-based convolutional neural network (CNN) trained to determine whether the image part constitutes a stock chart.

20. The non-transitory machine-readable medium of claim 16, wherein the content decision engine further includes a table identification component including an optical character recognition (OCR) tool designed to identify two-dimensional structures in each image part of the one or more image parts.

21. The non-transitory machine-readable medium of claim 20, wherein the OCR tool includes a neural network that identifies bounding boxes of characters in each image part of the one or more image parts and constructs a sparse two-dimensional grid of some of the characters.

\* \* \* \* \*